United States Patent [19]
Kojima et al.

[11] Patent Number: 6,100,959
[45] Date of Patent: Aug. 8, 2000

[54] CONVEYOR FOR PHOTO-PROCESSING APPARATUS

[75] Inventors: Masayuki Kojima; Seiji Minamiyama, both of Wakayama, Japan

[73] Assignee: Noritsu Koki Co., Ltd., Wakayama, Japan

[21] Appl. No.: 09/050,995

[22] Filed: Mar. 31, 1998

[30] Foreign Application Priority Data

Apr. 11, 1997 [JP] Japan .................................. 9-093708

[51] Int. Cl.[7] .......................... G03B 27/32; G03B 27/52; G03B 27/00
[52] U.S. Cl. ............................... 355/27; 355/40; 355/407
[58] Field of Search .................................. 355/27, 28, 29, 355/40, 41, 72, 407, 79, 97; 271/292, 294, 295, 298

[56] References Cited

U.S. PATENT DOCUMENTS

| | | | |
|---|---|---|---|
| 4,006,395 | 2/1977 | Reesen | 318/685 |
| 4,864,355 | 9/1989 | Knecht et al. | 355/27 |
| 4,903,100 | 2/1990 | Kogane et al. | 357/27 |
| 4,968,014 | 11/1990 | Yamakoshi et al. | 271/3.1 |
| 5,675,836 | 10/1997 | Matsumoto | 396/564 |
| 5,678,111 | 10/1997 | Matsumoto | 396/564 |
| 5,735,519 | 4/1998 | Ozawa et al. | 271/294 |
| 5,835,839 | 11/1998 | Kaneda | 399/361 |
| 5,857,128 | 1/1999 | Matsumoto | 396/612 |
| 6,040,896 | 3/2000 | Motooka | 355/72 |

FOREIGN PATENT DOCUMENTS

| | | |
|---|---|---|
| 7-287378 | 10/1995 | Japan . |
| 2103812 | 2/1983 | United Kingdom . |

*Primary Examiner*—David M. Gray
*Assistant Examiner*—Hung Henry Nguyen
*Attorney, Agent, or Firm*—Smith Patent Office

[57] ABSTRACT

A conveyor for a photo-processing apparatus having an exposing section and a developing section is disclosed. The conveyor conveys the photo-sensitive material from the exposing section to the developing section. A power source for conveying a photo-sensitive material in a vertical direction and a guide mechanism for guiding the photo-sensitive material in a lateral direction are installed in the conveyor. The lateral guidance of the photo-sensitive material by the guide mechanism is interlocked with the vertical conveyance by the power source to reduce the number of motors.

20 Claims, 10 Drawing Sheets

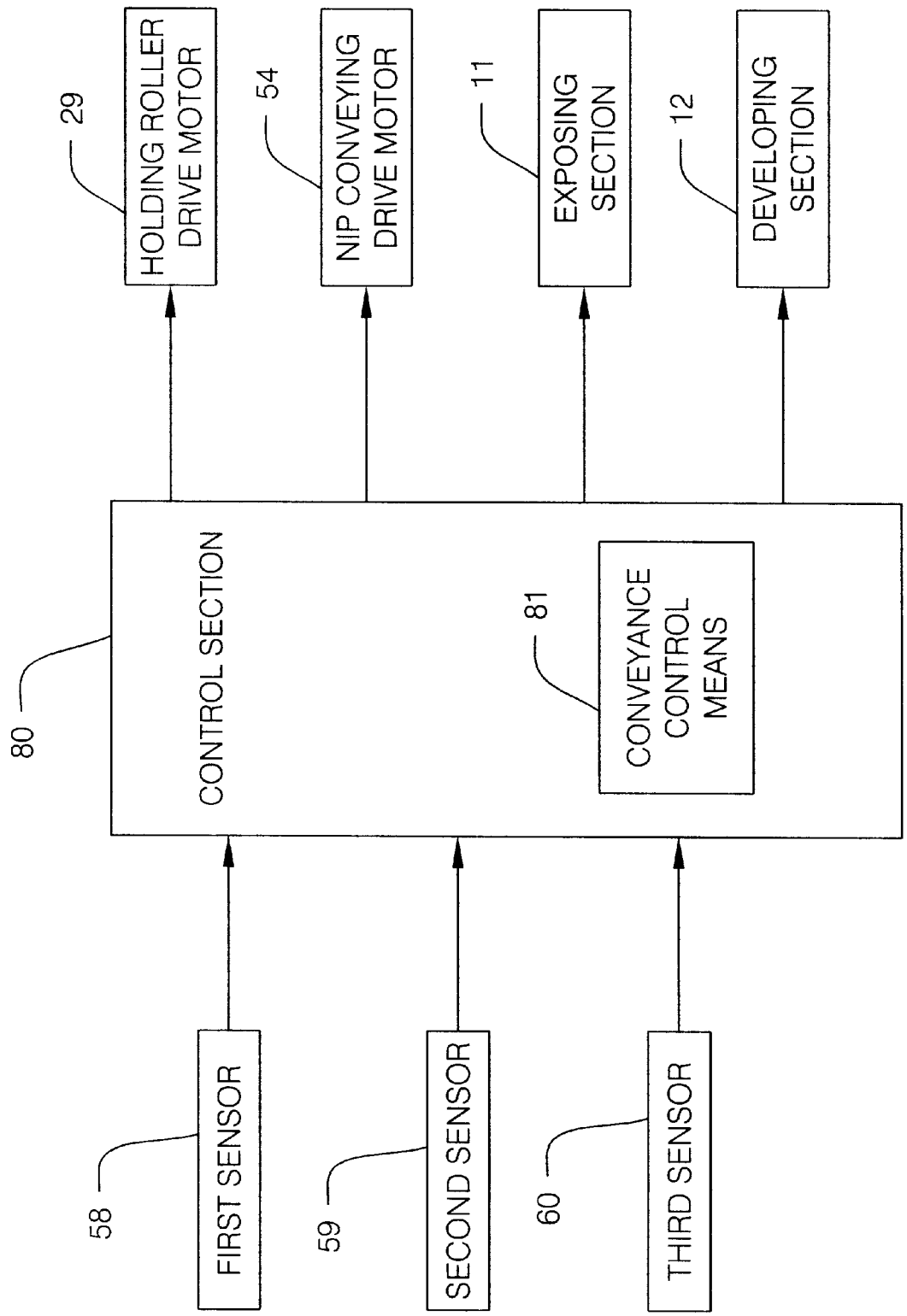

CONVEYOR FOR PHOTO-PROCESSING APPARATUS

BACKGROUND OF THE INVENTION

1. Field of the Invention

The present invention relates to a conveyor for conveying a photo-sensitive material along a conveying path from a first processing section to a second processing section, for example, from an exposing section to a developing section.

2. Discussion of the Related Art

The related art will be described with reference to FIGS. 9 and 10. FIG. 9 is an enlarged cross sectional view of an exposing section 11 and a part of a developing section 12 of a photo-processing apparatus.

In the exposing section 11, a photo-sensitive material 10, which is roll-shaped and wound at a magazine 9, is fed by a feed roller, cut into lengths corresponding to each frame by a cutter 1 and then the photo-sensitive material 10 is sent onto an exposing table 2. The exposing table 2 is provided with an endless adsorptive belt 3 which circulates along a triangular path composed of three rollers disposed at each vertex. The photo-sensitive material 10 is sent to a predetermined position by the movement of the belt 3 in a direction shown by an arrow A in FIG. 9.

The adsorptive belt 3 is provided with a plurality of small apertures and the photo-sensitive material 10 is adsorbed to the adsorptive belt 3 by providing a vacuum to the underside of the belt 3.

The photo-sensitive material 10 sent to the predetermined position on the exposing table 2 is exposed and printed with an image on a film 8 held in a negative-mask 6 using a light from a light source 4 projected through a mirror tunnel 5, a negative mask 6, a lens unit 7 and so on. After being exposed and printed, the photo-sensitive material 10 is sent to the next stage of the developing section 12 by a conveyor 13.

FIG. 11 is a plan view of the photo processing apparatus. The conveying path at the exposing section 11 shown by an arrow B in FIG. 11 is laterally offset from the conveying path at the developing section 12 shown by an arrow C in FIG. 11. Herein the lateral direction is defined as a direction shown by an arrow X in FIGS. 10 and 11 and it is substantially perpendicular to the conveying paths at each of the sections 11 and 12 shown by the arrows B and C in FIG. 11. The reason for the lateral offset is that the exposing section 11 can not be displaced at a space 14 in FIG. 11 where a reservoir or effluent tank for the developing section 12 is displaced.

Further, as is apparent from FIG. 9, the height at which the photo-sensitive material 10 is taken out of the exposing section 11 is lower than a height at which the photo-sensitive material is brought into the developing section 12. In other words, the height of the inlet of the developing section 12 is higher than the height of the outlet of the exposing section 11.

Under the above circumstances, conveying the photo-sensitive material from the exposing section 11 to the developing section 12 needs a lateral conveyance shown by the arrow X in FIGS. 10 and 11 and a vertical conveyance shown by an arrow Y in FIG. 9. The conveyor 13 is equipped to assist these conveyances.

FIG. 10 is an external perspective view of the conveyor 13. The conveyor 13 comprises a frame 16. The frame 16 rotationally holds a plurality of roller pairs 15 and holds a motor 17. The motor 17 drives the roller pairs 15 through an endless belt not shown. The frame 16 itself is attached to an endless belt 18. The endless belt 18 is driven by a motor 19 in the direction of the arrow X. The frame 16 is guided in the direction of the arrow X by a pair of upper and lower slide rails 20 connected with the frame 16 by a slidable connection.

In the developing section 12, a tank 21 is divided into several compartments by a plurality of partition boards 22. Each compartment is equipped with a rack which horizontally supports a plurality of roller pairs 23 for conveying the photo-sensitive material 10 in the tank 21 and is driven by a driving mechanism not shown. Between the conveyor 13 and the developing section 12 there are also rollers 24 for sending the photo-sensitive material 10 into the tank 21.

SUMMARY OF THE INVENTION

In the related art mentioned above, the conveyance from the exposing section (a first processing section) to the developing section (a second processing section) needs to be accomplished with both vertical conveyance and lateral conveyance. The vertical conveyance is executed by driving the roller pairs with the motor. The lateral conveyance is executed by driving the endless belt with the motor to slide the roller pairs.

Therefore, there is a problem in that the conveyor for the photo-processing increases in cost due to use of two types of motors, one for the lateral conveyance and one for the vertical conveyance of the photo-sensitive material as well as the complexity of the structure of the conveyor. In addition, the large number of the rollers for the vertical conveyance increase the cost.

An object of the present invention is to provide a conveyor for photo-processing which can reduce the cost of the conveyor with a simpler structure compared to the conventional systems.

Another object of the present invention is to provide a conveyor for photo-processing with a reduced number of rollers for vertical conveyance of the photo-sensitive material.

A characteristic structure of the present invention to solve the problem described above will now be described. In this invention a conveyor for a photo-processing apparatus having a first processing section and a second processing section are provided. As specific examples for the first processing section and the second processing section, it is described that the first processing section is an exposing section for printing an image from a photographic film on the photo-sensitive material and the second processing section is a developing section for developing the exposed photo-sensitive material. It is certain that these processing sections are not restricted as mentioned above.

This conveyor includes a power source for conveying a photo-sensitive material from the first processing section to the second processing section in a vertical direction and a guide mechanism for guiding the conveyed photo-sensitive material with the power source in a lateral direction. The lateral guidance of the photo-sensitive material with the guide mechanism is interlocked with the vertical conveyance with the power source. This conveyor can also include a power source for conveying the photo-sensitive material from the first processing section to the second processing section in the lateral direction and a guide mechanism for guiding the conveyed photo-sensitive material with the power source in the vertical direction. The vertical guidance of the photo-sensitive material with the guide mechanism is interlocked with the lateral conveyance with the power source.

These enable the photo-sensitive material to be conveyed in the vertical direction and also in the lateral direction by only one power source, for example a motor or a cylinder. Therefore, there is no need to install two types of power sources along the conveying path as was previously done. This provides a conveyor for a photo processing apparatus which results in a cost savings over previous systems.

Furthermore, for the conveyance of the photo-sensitive material, it is particularly preferable to install a pair of nipping rollers for nipping the photo-sensitive material and a holder for rotationally supporting the nipping rollers. The photo-sensitive material is conveyed while being nipped by the nipping rollers.

This enables the photo-sensitive material to be conveyed by nipping the photo-sensitive material with the nipping rollers and conveying the nipping rollers along the conveying path. Therefore, there is no need to dispose a number of pairs of rollers along the conveying path as was previously done. This provides the conveyor for the photo processing apparatus which results in a cost savings over previous systems.

Furthermore, regarding the guide mechanism, it is particularly preferable to install a first slider for vertically sliding the photo-sensitive material, a second slider for laterally sliding the photo sensitive material and third slider for sliding the photo-sensitive material in a direction defined between the lateral and vertical directions. As specific examples of the first and second sliders, guide bars are described. Also as a specific example of the third slider, a guide rail and guide rollers are also described.

This enables the photo-sensitive material to be guided along an ideal path by guiding the photo-sensitive material with the first, second and third slider. Therefore, there is no need to install the other motor only for the lateral guidance as was previously done. This provides the conveyor for the photo processing apparatus which results in a cost savings over the previous systems.

Furthermore, regarding the conveying path from the first processing section to the second processing section, it is particularly preferable to construct the conveying path so that it includes a portion elongated in a direction defined between the lateral direction and the vertical direction.

Other characteristic features and effects of the present invention will become obvious by the description of the embodiments below with reference to the drawings.

BRIEF DESCRIPTION OF THE DRAWINGS

The above and other objects and features of the present invention will be clearly understood from the following description with respect to preferred embodiments thereof when considered in conjunction with the accompanying drawings, wherein the same reference numerals have been used to denote the same or similar parts or elements, and in which:

FIG. 5 is a control diagram according to the first embodiment of the present invention;

DETAILED DESCRIPTION OF THE PREFERRED EMBODIMENTS

Figure 1:
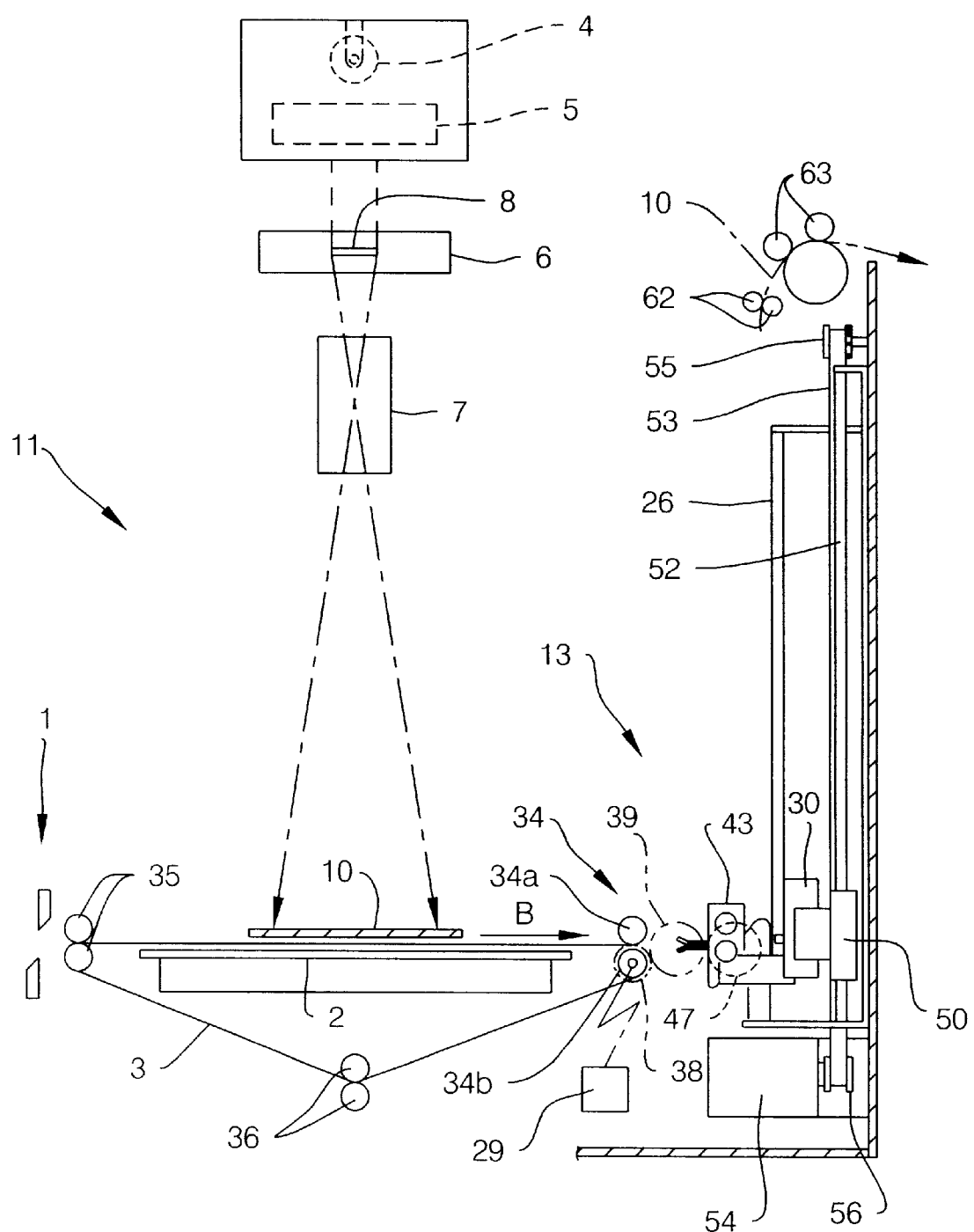
FIG. 1 is a cross sectional view of an exposing section and a conveyor of a photographic processing apparatus according to a first embodiment of the present invention.

There will now be described the preferred embodiments of the present invention with reference to the attached drawings. FIGS. 1–7 show a first embodiment of the present invention.

In FIGS. 1–4, an exposing section 11 and a conveyor 13 of a photo processing apparatus are shown. The basic construction of the exposing section 11 is similar to that in FIG. 9 and the detailed description will be omitted and the same reference numerals and symbols are used as those in FIGS. 9–11. On each vertex of a triangle formed by an adsorptive belt 3 are disposed roller pairs 34, 35 and 36 respectively. A photo-sensitive material 10 is conveyed from the left side to the right side as shown by an arrow B in FIG. 1. The pair of rollers 34 on the downstream side of the exposing section 30 comprise a press roller 34a and a drive roller 34b. On the downstream side thereof, a conveyor 13 is installed.

The conveyor comprises a lower holding roller 40; an upper holding roller 41; a guide member 42 for guiding the photo-sensitive material 10 to the pair of rollers 40 and 41; a first roller holding table 43 which rotationally holds the pair of rollers 40 and 41 and to which the guide member 42 is attached; a second roller holding table 44 for rotationally holding the first roller holding table 43 around the same axis as that of the lower holding roller 40; a torsion coil spring 45 for urging the first roller holder 43 in a clockwise direction in FIG. 1; a rotation restricting board 46 for restricting the rotation of the first roller holding table 43 in the clockwise direction; and a gear 47 installed so as to have a common axis with the lower holding roller 40. The rotation restricting board 46 is fixed to a table plate 61. The upper side of the rotation restricting board 46 is equipped with a guiding part 46a having a circular arc face. The pair of holding rollers 40 and 41 are fixed to a holder 30 with the first and second roller holding tables 43 and 44. Herein, the pair of holding rollers 40 and 41 function as nipping means for nipping the photo-sensitive material 10 while being conveyed.

The drive roller 34b is driven by a holding roller drive motor 29. At the same time, the driving force is transmitted to the lower holding roller 40 through a first gear 38 which is disposed so as to have a common axis with and fixedly rotate with the drive roller 34b, a second gear 39 and the gear 47. The gear 47 and the lower holding roller 40 are engaged with each other through a one way clutch not shown.

The structure for conveying the photo-sensitive material in the vertical and lateral directions will now be explained.

Figure 2:
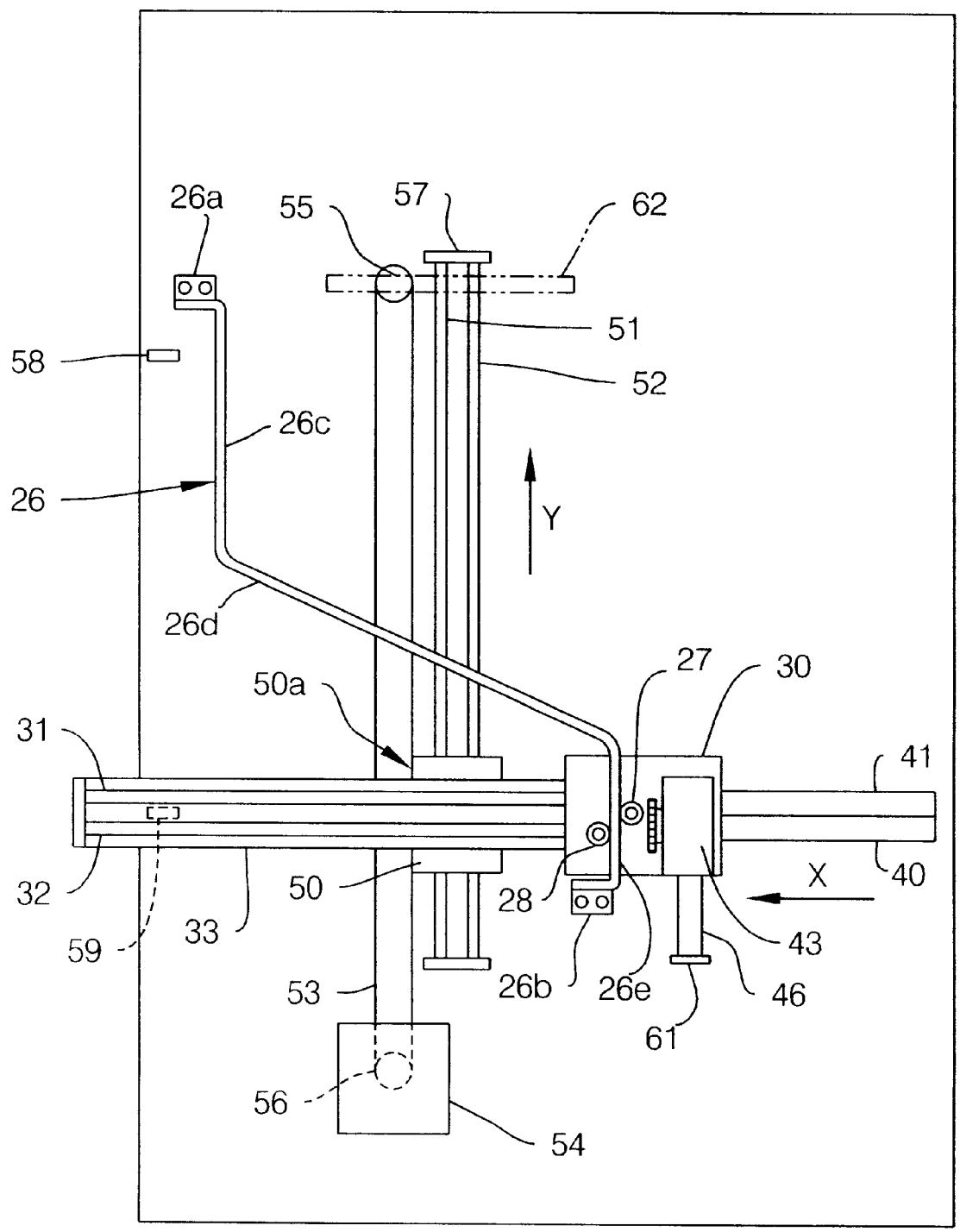
FIG. 2 is an elevational view of the conveyor according the first embodiment of the present invention.
Figure 3:
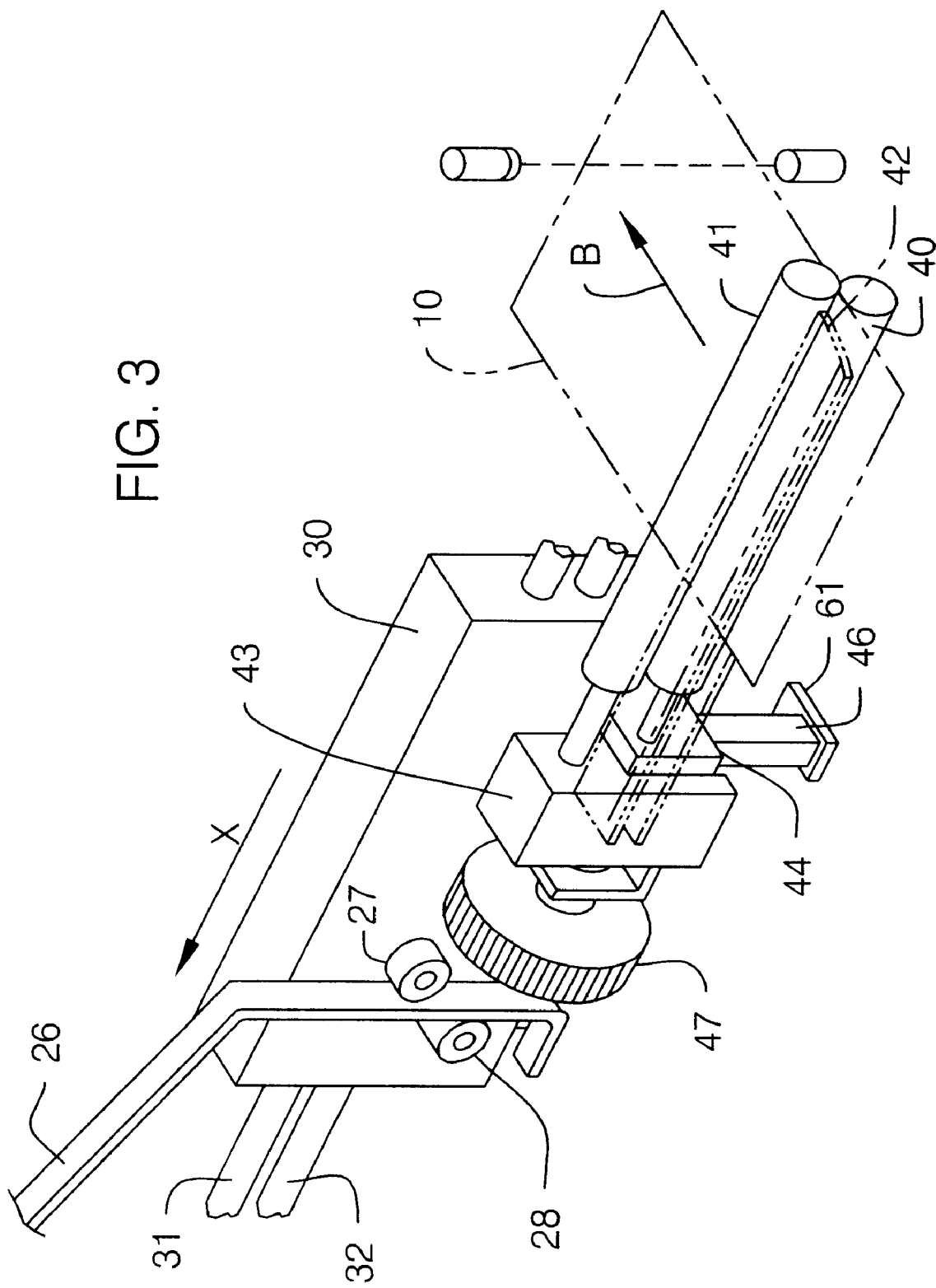
FIG. 3 is a perspective view of a part of the conveyor according to the first embodiment of the present invention.

As shown in FIG. 2, the holder 30 is guided by a pair of upper and lower guide bars 31 and 32 in the lateral direction as shown by an arrow X. The guide bars 31 and 32 are fixed to a first guide bar holder 33. As shown in FIG. 3, the guide bars 31 and 32 penetrate each of holes formed in the holder 30 so that the holder 30 slides along the guide bars 31 and 32 in the lateral direction. Then, they function as a second slider. Further, a guide rail 26 and guide rollers 27 and 28 for vertically and laterally guiding the holder 30 are equipped and they function as a guide mechanism for conveying the photo-sensitive material in the lateral direction to function as a third slider. The guide rail 26 comprises upper and lower attachments 26a and 26b at its upper and lower portions for fixing the guide rail 26 to the table plate 61, a first straight portion 26c located just below the upper attachment 26a, a second straight portion 26e located just above the lower attachment 26b and a slant portion 26d located between the first and second straight portions 26c and 26e. The guide rollers 27 and 28 are rotationally attached to the holder 30 and displaced suitably for the movement along the slant portion 26d.

As shown in FIG. 2, the first guide bar holder 33 is fixed to a guide holder 50. The guide holder 50 is guided in the lateral direction by a pair of right and left guide bars 51 and 52. The guide bars 51 and 52 penetrate each of holes formed at the guide holder 50 so that the guide holder 50 slides along the guide bars 51 and 52 in the vertical direction. Then, they function as a first slider. An endless belt 53 is fixed to a side face 50a of the guide holder 50. The endless belt 53 circulates around the upper and lower sprockets 55 and 56 and the lower sprocket is driven by a nip conveying drive motor 54; and therefore the holder 50 is vertically conveyed by the nip conveying drive motor 54. Then, they function as a power source for conveying the photo sensitive material in the vertical direction. The guide bars 51 and 52 are fixed to a second guide bar holder 57 which is fixed to the table plate 61. Further, a first sensor 58 and a second sensor 59 are installed for detecting vertical displacement of the holder 30. As the practical example, a projecting portion or a notch can be made at the guide bar holder 33 and it can be optically detected.

As shown in FIG. 4, a third sensor 60 composed of a light emitter 60a and a light receiver 60b for detecting an edge of the photo-sensitive material 10 is equipped.

Figure 9:
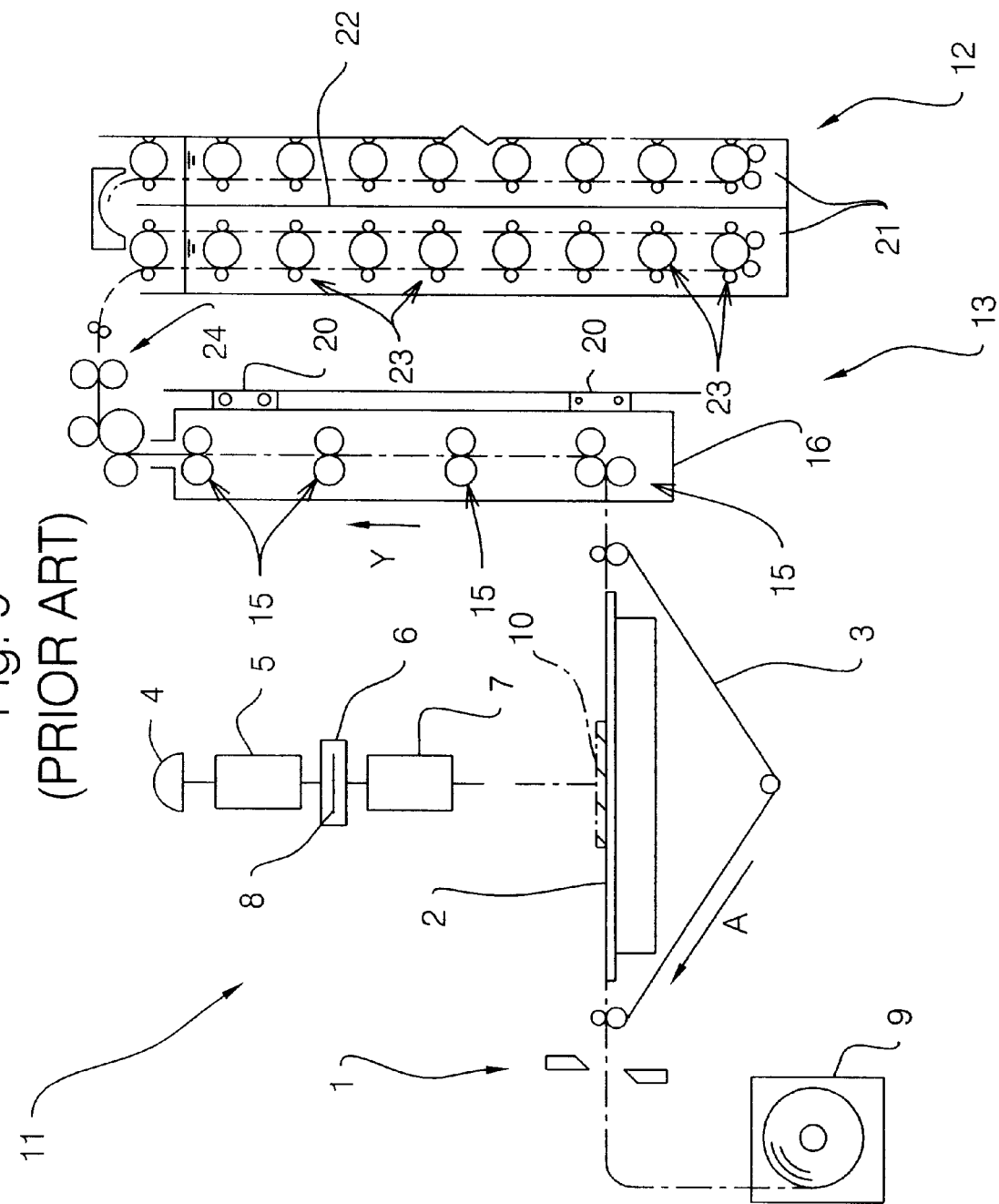
FIG. 9 is a cross sectional view of the photographic processing apparatus of the related art.
Figure 10:
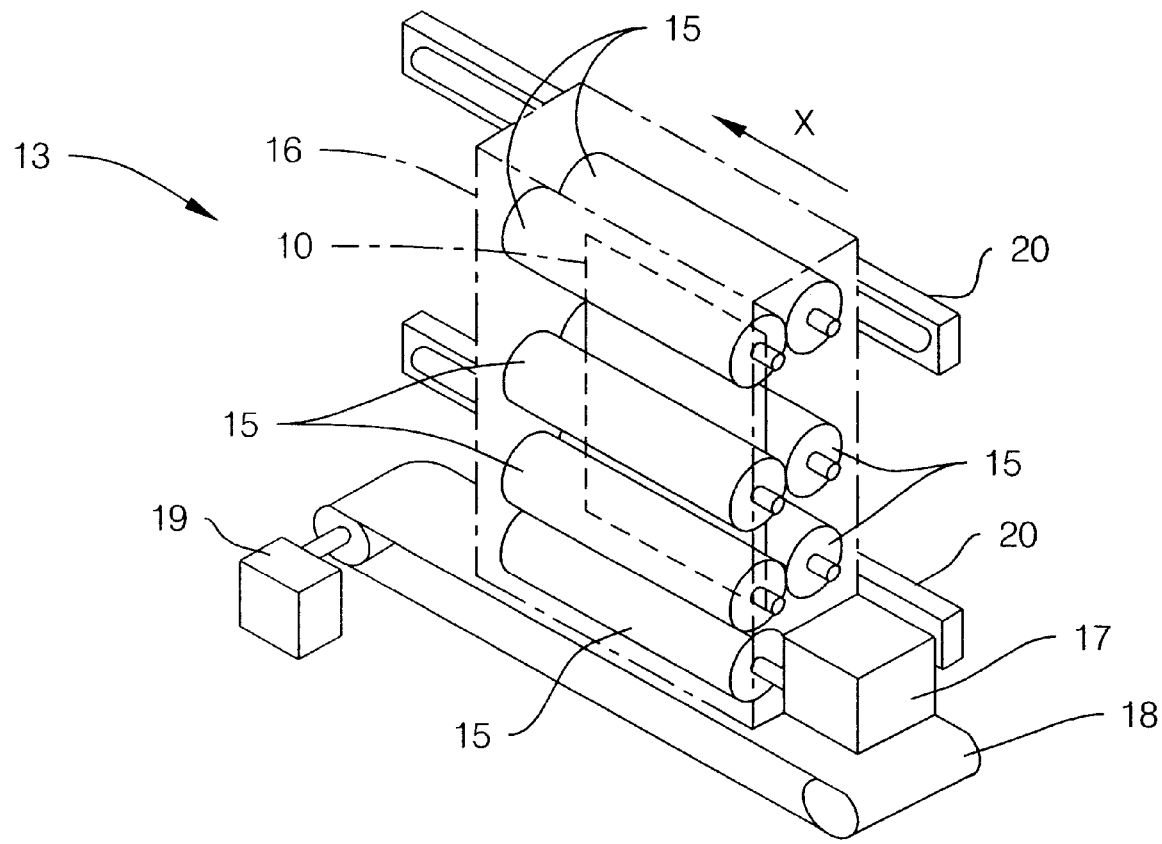
FIG. 10 is a perspective view of the conveyor of the related art.
Figure 11:
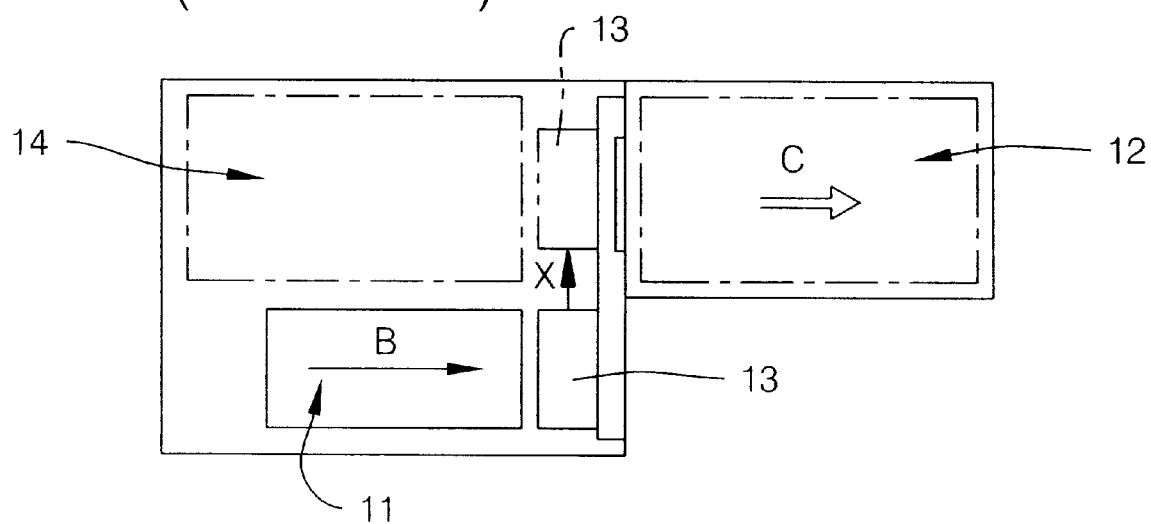
FIG. 11 is a plan view of the photographic processing apparatus of the related art.

Further as shown in FIG. 1, at an upper portion of the conveyor 13, a pair of rollers 62 for receiving the conveyed photo-sensitive material and a pair of rollers 63 for sending the photo-sensitive material 10 to the developing section 12 are installed. The detailed description for the developing section 12 of this embodiment will be omitted; but the same structure and configuration are used as that in FIGS. 9 and 11. Especially, an inlet of a tank 21 of the developing section 12 is located higher than an outlet of the exposing section 11 which is similar to the location nipped by the upper and lower holding rollers 34a and 34b as shown in FIG. 11; and they are laterally offset from each other as shown in FIG. 9.

FIG. 5 is a control block diagram for this apparatus. Each section of the photo-processing apparatus is controlled by a control section 80 having a microcomputer at its core. A conveyance control means 81 controls the driving conditions of the holding roller drive motor 29 and the nip conveyance drive motor 54 based on output signals from the first sensor 58, the second sensor 59 and the third sensor 60. In addition, the control section 80 also controls an operation of the exposing section 11 and the developing section 12.

The operation of the first embodiment will now be described. As shown in FIG. 1, after the photo-sensitive material 10 cut into each frame by the cutter 1 has been sent to the exposing table 2, it is exposed and printed with the image on the negative film 8.

Figure 4A:
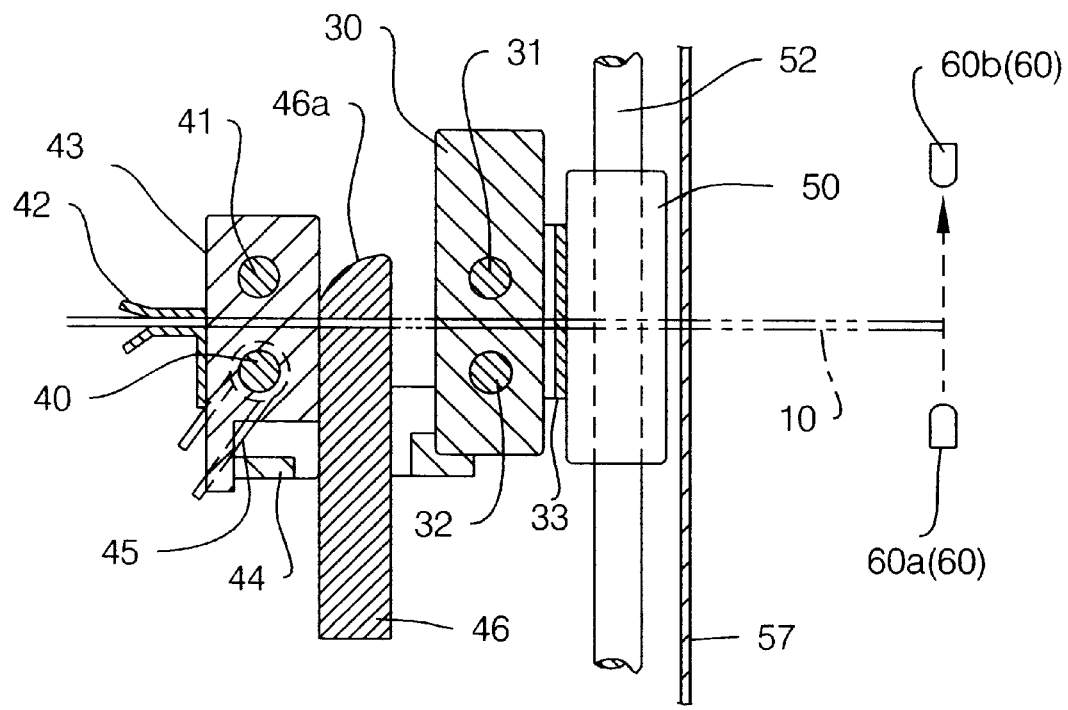
FIGS. 4A and 4B are first operational diagrams illustrating the operation of the conveyor according to the first embodiment of the present invention.
Figure 4B:
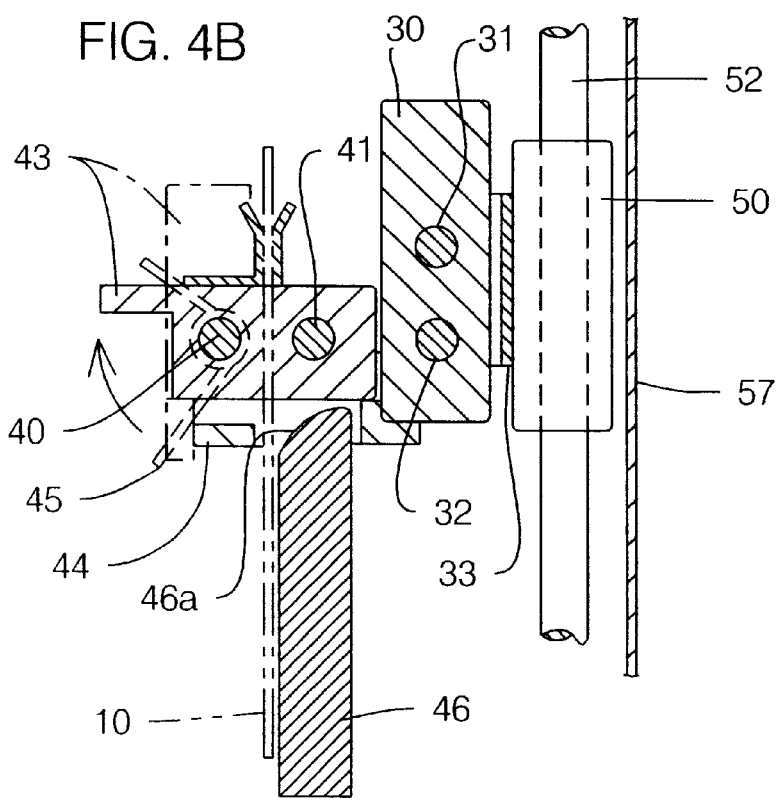

Next, as shown in FIG. 4A, after the exposed photo-sensitive material 10 has been brought by the pair of rollers 34, it is guided by the guide member 42 and conveyed by the holding rollers 40 and 41 in the direction shown by the arrow B in FIG. 1. When the edge of the photo-sensitive material is detected by the third sensor 60, the conveyance control means 81 makes the holding roller drive motor 29 stop driving the holding rollers 40 and 41 while the holding rollers 40 and 41 nip the photo-sensitive material 10. After that, the conveyance control means 81 makes the nip conveying drive motor 54 start to raise the holder 30 while nipping the photo-sensitive material 10.

In the condition shown in FIG. 4A, the clockwise rotation of the first roller holder 43 urged by the torsion coil spring 45 is being restricted by the rotation restricting board 46. However, when the holder 30 is raised up to the position shown in FIG. 4B, the first roller holder 43 is released from the restriction of the rotation restricting board 46 and is urged to be rotated clockwise through 90 degrees by the torsion coil spring 45. According to this movement, the photo-sensitive material 10 changes its angle of orientation from horizontal to vertical. By changing the angle of orientation, the surface with the emulsion is moved from outside the conveying path to the inside thereof. This system is referred to as a switch back system because of the exchange of the front and back surfaces on the conveying path.

The status in which the photo-sensitive material 10 is conveyed in the vertical and lateral directions will now be described with reference to FIGS. 2, 6 and 7. When the third sensor 60 shown in FIG. 4 detects that the photo-sensitive material 10 is sent and nipped, the conveyance control means make the nip conveying drive motor 54 start driving to convey the holder 30 nipping the photo-sensitive material 10 with the holding rollers 40 and 41 in the vertical direction. As shown in FIG. 2, when the holder 30 is guided with the guide rollers 27 and 28 along the second straight portion 26e of the guide rail 26, the photo-sensitive material 10 is only raised while the guide holder 50 is guided with the guide bars 51 and 52.

Figure 6:
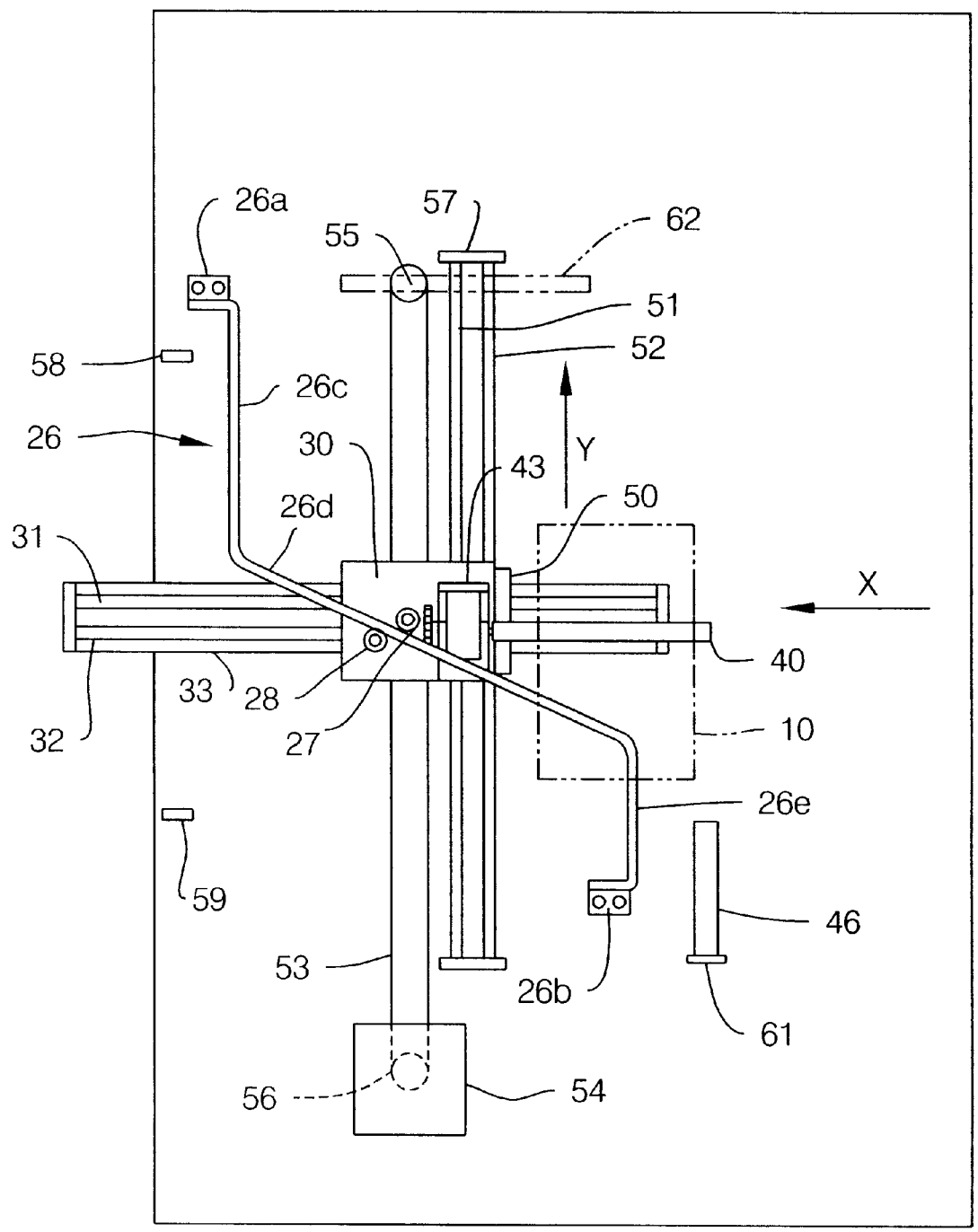
FIGS. 6 and 7 are second operational di a grams illustrating the operation of the conveyor according to the first embodiment of the present invention.
Figure 7:
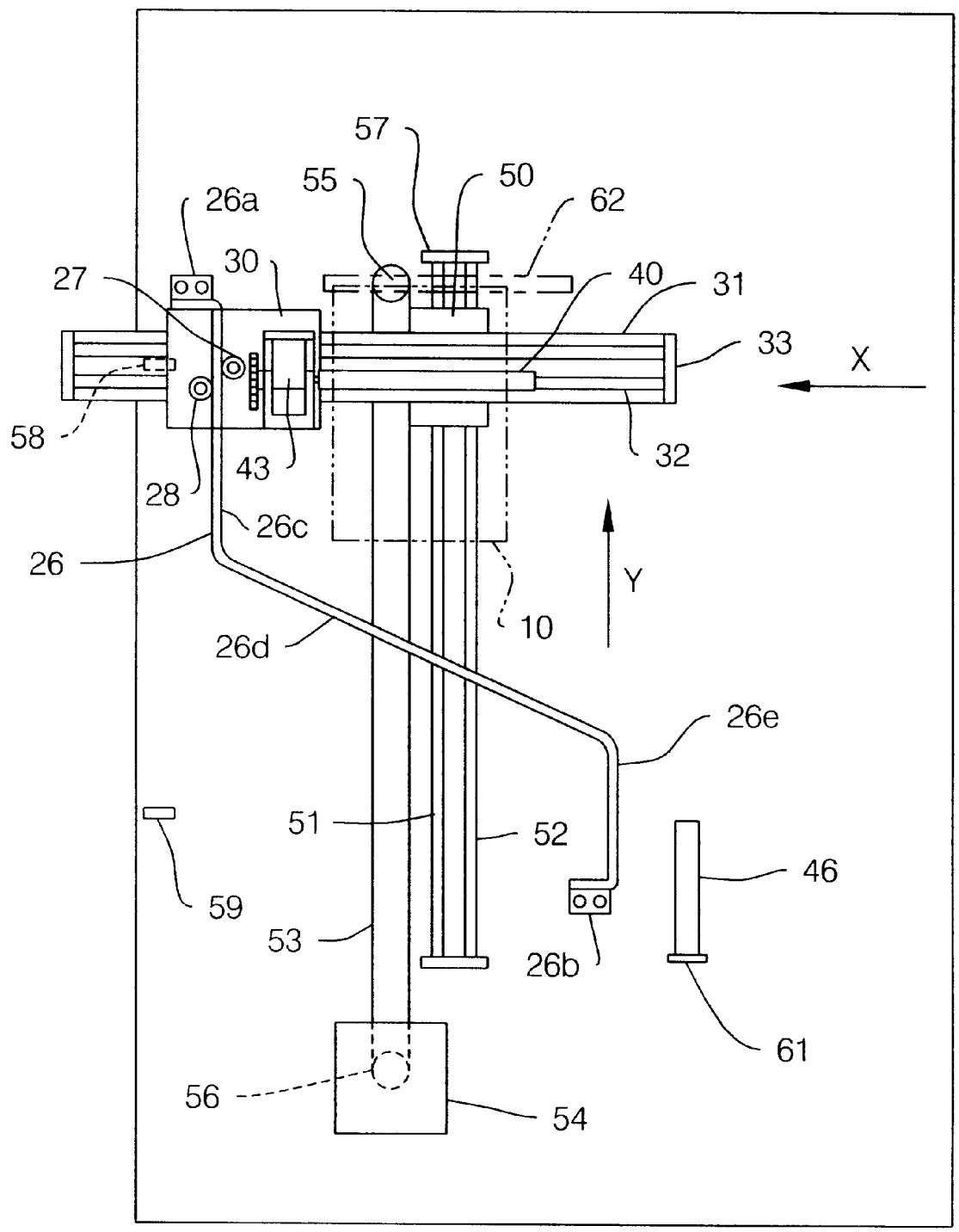

As shown in FIG. 6, when the guide rollers 27 and 28 are conveyed to the position of the slant portion 26d of the guide rail 26, the photo-sensitive material begins to move in the lateral direction while the guide holder 50 is guided with the guide bars 51 and 52. The holder 30 is also guided by the guide bars 31 and 32 which are fixed to the guide holder 50 with the first guide bar holder 33. At the slant portion 26d, the photo-sensitive material 10 is also conveyed in the vertical direction while being conveyed in the lateral direction. When the guide rollers 27 and 28 come to the position of the first straight portion 26c, the photo-sensitive material 10 is again only raised while the guide holder 50 is guided with the guide bars 51 and 52. When the first sensor 58 detects an end of the ascent of the photo-sensitive material 10, the conveyance control means make the nip conveying motor 54 stop driving so as to convey the holder 30 nipping the photo-sensitive material 10 with the holding rollers 40 and 41. In this condition, the edge of the photo-sensitive material 10 is transferred to the pair of rollers 62 by nipping the photo-sensitive material with the rollers 62 and 63 and a free rotation of the holding rollers 40 and 41. Therefore the photo-sensitive material has been conveyed from the outlet of the exposing section 11 to the inlet of the developing section which is located higher than and laterally offset from the outlet of the exposing section 11. After that, the photo-sensitive material 10 is developed in the developing section 12.

After the transfer of the photo-sensitive material 10 has been finished, the conveyance control means drives the nip conveying drive motor 54 in a reverse direction so that the holders 30 with the holding rollers 40 and 41 and so on are moved back to their initial position. The return to the initial position is detected by the second sensor 59 and the conveyance control means 81 stops the nip conveying driving motor 54 driving in the reverse direction.

Further, a second embodiment will now be explained with reference to FIG. 8. The basic construction of the exposing section 11 and the developing section 12 is similar to that of the first embodiment and the detailed description will be omitted and the same reference numerals and symbols are used as those in the first embodiment.

Figure 8:
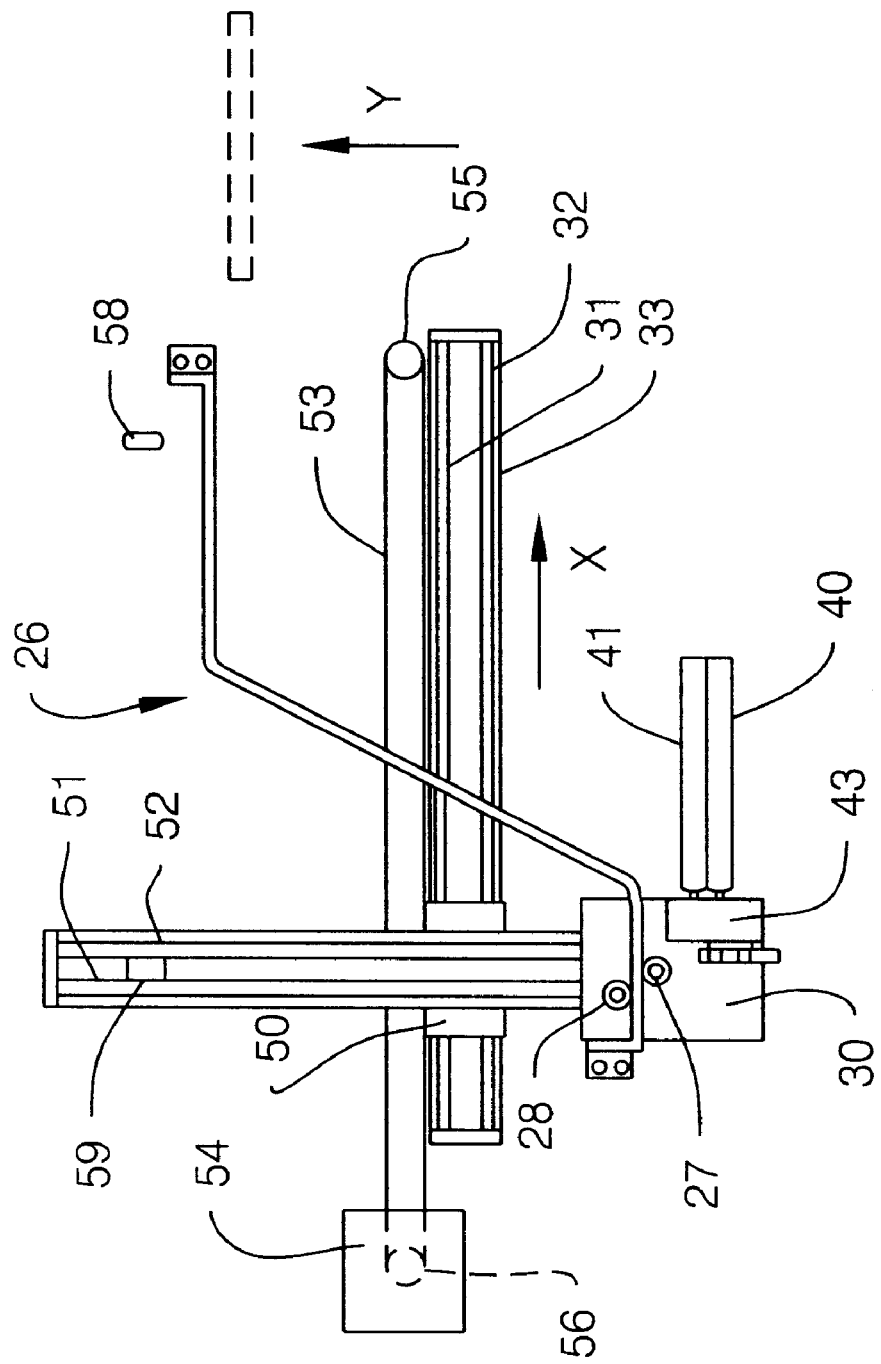
FIG. 8 is an elevational view of a conveyor according to a second embodiment of the present invention.

Although in the first embodiment, the nip conveying drive motor 54 is used for the vertical conveyance of the photo-sensitive material 10 and the guide rail 26 interlocks the lateral guidance with the vertical conveyance, the nip conveying drive motor 54 may be used as the power source for the lateral conveyance of the photo-sensitive material 10 by the configuration of the sprockets 55 and 56 as shown in FIG. 8. The guide rail 26 and the guide rollers 27 and 28 interlock the vertical guidance with the lateral conveyance and function as the guide mechanism for the vertical guidance as shown in FIG. 8.

Other embodiments of the present invention will now be described as follows.

Although the combination of the guide rail 26 and the guide rollers 27 and 28 is used as the composition of the guide mechanism in the above embodiments, other variations such as combination of a cam and a cam follower may be used.

Although the motors 29 and 54 are used as the power source in the above embodiments, other means like a cylinder may be used.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A conveyor for a photo-processing apparatus, the photo-processing apparatus having a first processing section and a second processing section, said conveyor conveying a photo-sensitive material from said first processing section to said second processing section in both a lateral direction and a vertical direction with respect to a direction that said conveyor receives the photo-sensitive material, said conveyor including a holding mechanism for holding the photo-sensitive material, a single power source for driving said holding mechanism and a guide mechanism for guiding said holding mechanism in both the lateral and the vertical directions.

2. A conveyor for a photo-processing apparatus as claimed in claim 1, wherein said guide mechanism allows simultaneous movement in both the lateral and vertical directions.

3. A conveyor for a photo-processing apparatus as claimed in claim 1, wherein said first processing section is an exposing section for printing an image on a photographic film on the photo-sensitive material and said second processing section is a developing section for developing the exposed photo-sensitive material.

4. A conveyor for a photo-processing apparatus as claimed in claim 3, wherein an inlet of said developing section is displaced higher than an outlet of said exposing section, said inlet of said developing section also being laterally offset from said outlet of said exposing section.

5. A conveyor for a photo-processing apparatus as claimed in claim 1, wherein said holding mechanism comprising a pair of nipping rollers for nipping the photo-sensitive material and a holder for rotationally supporting said nipping rollers and wherein the photo-sensitive material is conveyed while nipped by said nipping rollers.

6. A conveyor for a photo-processing apparatus as claimed in claim 5, wherein said guide mechanism further comprising a guide rail and a guide roller which is guided by said guide rail and wherein said guide roller is rotationally attached to said holder.

7. A conveyor for a photo-processing apparatus as claimed in claim 1, wherein said guide mechanism further comprising a first slider for vertically sliding the said holding mechanism, a second slider for laterally sliding said holding mechanism and a third slider for sliding said holding mechanism in a direction including the lateral and vertical directions.

8. A conveyor for a photo-processing apparatus as claimed in claim 7, wherein said third slider further comprising a guide rail having a portion elongated in the direction including both the lateral and vertical directions and guide rollers which are guided by said guide rail.

9. A conveyor for a photo-processing apparatus as claimed in claim 7, wherein said power source conveys said holding mechanism along said first slider.

10. A conveyor for a photo-processing apparatus, the photo-processing apparatus having a first processing section and a second processing section, said conveyor conveying a photo-sensitive material from said first processing section to said second processing section in both a vertical direction and a lateral direction with respect to a direction that said conveyor receives the photo-sensitive material, said conveyor including a nipping mechanism for holding the photo-sensitive material, a single power source for driving said nipping mechanism and a guide mechanism for guiding said nipping mechanism.

11. A conveyor for a photo-processing apparatus as claimed in claim 10, wherein said guide mechanism allows movement in both the lateral and vertical directions.

12. A conveyor for a photo-processing apparatus as claimed in claim 10, wherein said first processing section is an exposing section for printing an image on a photographic film on the photo-sensitive material and said second processing section is a developing section for developing the exposed photo-sensitive material.

13. A conveyor for a photo-processing apparatus as claimed in claim 12, wherein an inlet of said developing section is displaced higher than an outlet of said exposing section, said inlet of said developing section also being laterally offset from said outlet of said exposing section.

14. A conveyor for a photo-processing apparatus as claimed in claim 10, wherein said nipping mechanism comprising a pair of nipping rollers for nipping the photo-sensitive material and a holder for rotationally supporting said nipping rollers and wherein the photo-sensitive material is conveyed while nipped by said nipping rollers.

15. A conveyor for a photo-processing apparatus as claimed in claim 14, wherein said guide mechanism further comprising a guide rail and a guide roller which is guided by said guide rail and wherein said guide roller is rotationally attached to said holder.

16. A conveyor for a photo-processing apparatus as claimed in claim 10, wherein said guide mechanism further comprising a first slider for vertically sliding said nipping mechanism, a second slider for laterally sliding said nipping mechanism and a third slider for sliding said nipping mechanism in a direction including the lateral and vertical directions.

17. A conveyor for a photo-processing apparatus as claimed in claim 16, wherein said third slider further comprising a guide rail having a portion elongated in a direction including both the lateral and vertical directions and guide rollers which are guided by said guide rail.

18. A conveyor for a photo-processing apparatus as claimed in claim 16, wherein said power source conveys said nipping mechanism along said second slider.

19. A conveyor for a photo-processing apparatus, the photo-processing apparatus having a first processing section and a second processing section, said conveyor conveying a photo-sensitive material from said first processing section to said second processing section along a conveying path, said conveying path being in both a lateral direction and a vertical direction with respect to a direction that said conveyor receives the photo-sensitive material, said conveyor including a first mechanism for holding the photo-sensitive material and a single power source for driving said first mechanism along the conveying path.

20. A conveyor for a photosensitive material as claimed in claim 19, wherein the conveying path follows a guide rail and said conveyor further includes guide rollers which are guided by said guide rail.

* * * * *